Feb. 13 1951   W. SCHADE   2,541,484
OBJECTIVES OF PETZVAL TYPE WITH A HIGH INDEX COLLECTIVE
LENS ELEMENT CEMENTED TO LOWER INDEX DISPERSIVE ELEMENT
Filed Dec. 17, 1948                                       3 Sheets-Sheet 1

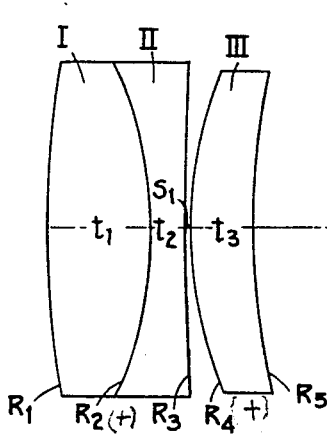
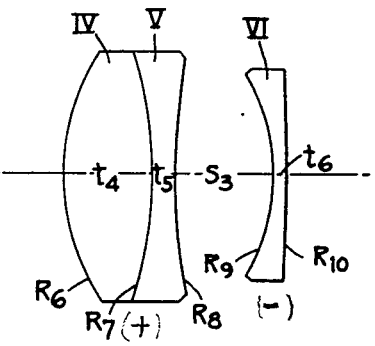

| FOCAL LENGTH = 100 mm. | | | | f/1.5 | |
|---|---|---|---|---|---|
| LENS | N | V | RADII | | THICKNESSES |
| I | 1.517 | 64.5 | $R_1$ = | +170.91 mm | $t_1$ = 19.36 mm. |
| II | 1.649 | 33.8 | $R_2$ = | − 76.88 | $t_2$ = 6.34 |
|  |  |  | $R_3$ = | +1608. | $S_1$ = 0.97 |
| III | 1.744 | 45.8 | $R_4$ = | + 79.53 | $t_3$ = 11.62 |
|  |  |  | $R_5$ = | +144.64 | $S_2$ = 74.35 |
| IV | 1.697 | 56.2 | $R_6$ = | + 42.30 | $t_4$ = 16.54 |
| V | 1.673 | 32.2 | $R_7$ = | − 77.49 | $t_5$ = 4.13 |
|  |  |  | $R_8$ = | +121.34 | $S_3$ = 18.22 |
| VI | 1.617 | 36.6 | $R_9$ = | − 38.45 | $t_6$ = 2.07 |
|  |  |  | $R_{10}$ = | −966.2 | BF = 10.0 |

FIG. 3.

| FOCAL LENGTH = 100 mm. | | | | f/1.5 | |
|---|---|---|---|---|---|
| LENS | N | V | RADII | | THICKNESSES |
| I | 1.517 | 64.5 | $R_1$ = | +173.21 mm | $t_1$ = 19.60 mm. |
| II | 1.649 | 33.8 | $R_2$ = | − 77.93 | $t_2$ = 6.41 |
|  |  |  | $R_3$ = | +1630. | $S_1$ = 0.98 |
| III | 1.744 | 45.8 | $R_4$ = | + 92.43 | $t_3$ = 11.76 |
|  |  |  | $R_5$ = | +197.71 | $S_2$ = 76.72 |
| IV | 1.697 | 56.2 | $R_6$ = | + 43.22 | $t_4$ = 16.74 |
| V | 1.612 | 35.1 | $R_7$ = | − 57.82 | $t_5$ = 4.16 |
|  |  |  | $R_8$ = | + 92.94 | $S_3$ = 18.33 |
| VI | 1.615 | 31.9 | $R_9$ = | − 32.95 | $t_6$ = 2.16 |
|  |  |  | $R_{10}$ = | −118.87 | BF = 10.0 |

WILLY SCHADE
*INVENTOR*

BY *Harold F Bennett*
*ATTORNEY & AGENT*

Feb. 13 1951 — W. SCHADE — 2,541,484
OBJECTIVES OF PETZVAL TYPE WITH A HIGH INDEX COLLECTIVE
LENS ELEMENT CEMENTED TO LOWER INDEX DISPERSIVE ELEMENT
Filed Dec. 17, 1948 — 3 Sheets-Sheet 2

FIG. 4.

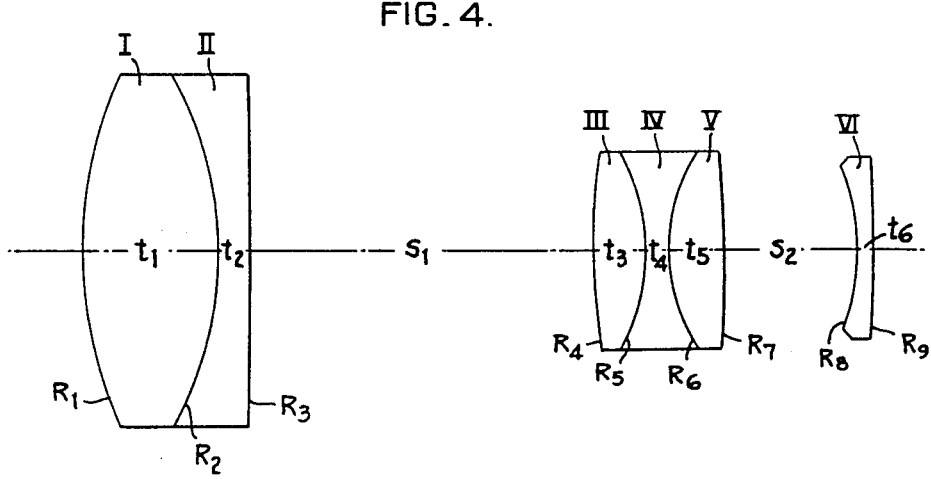

FIG. 5.

| FOCAL LENGTH = 100 mm. | | | | f/1.6 |
|---|---|---|---|---|
| LENS | N | V | RADII | THICKNESSES |
| I | 1.523 | 58.6 | $R_1 = +79.35$ mm. | $t_1 = 25.66$ mm. |
| II | 1.649 | 33.8 | $R_2 = -68.95$ | $t_2 = 6.43$ |
|   |   |   | $R_3 = -1786.$ | $S_1 = 64.35$ |
| III | 1.517 | 64.5 | $R_4 = +110.14$ | $t_3 = 9.83$ |
| IV | 1.580 | 41.0 | $R_5 = -37.65$ | $t_4 = 3.93$ |
| V | 1.880 | 41.1 | $R_6 = +34.80$ | $t_5 = 9.82$ |
|   |   |   | $R_7 = -554.1$ | $S_2 = 25.33$ |
| VI | 1.615 | 31.9 | $R_8 = -40.72$ | $t_6 = 1.98$ |
|   |   |   | $R_9 = -1004.$ | BF = 9.83 |

WILLY SCHADE
*INVENTOR*

BY Newton M. Perriss
Harold F. Bennett
*ATTORNEY & AGENT*

| FOCAL LENGTH = 100 mm. | | | | f/1.6 | |
|---|---|---|---|---|---|
| LENS | N | V | RADII | | THICKNESSES |
| I | 1.523 | 58.6 | $R_1$ = | +76.73 mm. | $t_1$ = 25.8 mm. |
| II | 1.649 | 33.8 | $R_2$ = | −71.71 | $t_2$ = 6.4 |
| | | | $R_3$ = | ∞ | $s_1$ = 71.1 |
| III | 1.697 | 56.2 | $R_4$ = | +43.80 | $t_3$ = 16.9 |
| IV | 1.621 | 36.2 | $R_5$ = | −49.26 | $t_4$ = 4.2 |
| | | | $R_6$ = | +90.76 | $s_2$ = 17.6 |
| V | 1.523 | 58.6 | $R_7$ = | −31.80 | $t_5$ = 4.2 |
| | | | $R_8$ = | −77.09 | BF = 9.9 |

| FOCAL LENGTH = 100 mm. | | | | f/1.5 | |
|---|---|---|---|---|---|
| LENS | N | V | RADII | | THICKNESSES |
| I | 1.523 | 58.6 | $R_1$ = | +84.39 mm. | $t_1$ = 26.36 mm. |
| II | 1.649 | 33.8 | $R_2$ = | −68.81 | $t_2$ = 6.60 |
| | | | $R_3$ = | −989.3 | $s_1$ = 79.86 |
| III | 1.697 | 56.1 | $R_4$ = | +43.26 | $t_3$ = 16.36 |
| IV | 1.621 | 36.2 | $R_5$ = | −51.87 | $t_4$ = 4.06 |
| | | | $R_6$ = | +96.74 | $s_2$ = 22.18 |
| V | 1.572 | 56.8 | $R_7$ = | −25.44 | $t_5$ = 2.20 |
| | | | $R_8$ = | −97.70 | BF = 4.9 |

WILLY SCHADE
*INVENTOR*
BY
*ATTORNEY & AGENT*

Patented Feb. 13, 1951

2,541,484

UNITED STATES PATENT OFFICE 2,541,484

OBJECTIVES OF PETZVAL TYPE WITH A HIGH INDEX COLLECTIVE LENS ELEMENT CEMENTED TO LOWER INDEX DISPERSIVE ELEMENT

Willy Schade, Rochester, N. Y., assignor to Eastman Kodak Company, Rochester, N. Y., a corporation of New Jersey Application December 17, 1948, Serial No. 65,864

9 Claims. (Cl. 88—57)

This invention relates to projection objectives.

The object of the invention is to provide a very high apertures projection objective of the Petzval type with a field flattener which has a longer back focal length than usual in this type objective and which is highly corrected for the five ordinary aberrations as well as axial and lateral color and zonal and oblique spherical aberration.

Petzval objectives are well known and comprise two positive members made up of a total of from three to seven lens elements and separated by a central airspace which ranges from about 0.2 F to about 1.3 F in length where F is the focal length of the objective as a whole. A greater number of elements can be used, but for most purposes would not be worth the added expense. The focal length of the front member is usually between 1.4 F and 2.5 F, and that of the rear positive member between 0.7 F and 1.5 F. As regards shapes, the front surface of the front member is convex and its center of curvature is behind the center of the central space; exceptions to this rule never having proven satisfactory. The centers of curvature of the surfaces bounding the central airspace are always outside the body of the objective; otherwise the objective would not be classed as a Petzval objective. And finally, the center of curvature of the rear surface of the rear positive member is never between the center of the central airspace and the principal focal plane, and rarely is it within the body of the objective. The two positive members may include small airspaces, but for practical reasons it is generally considered preferable to cement together at least one positive element and one negative element in each member. Another distinguishing feature of the Petzval objective is that parallel light striking the front surface is always convergent within the objective.

In 1874 C. Piazzi Smyth introduced the field flattener, which was originally a negative component immediately in front of the focal plane. This component improves the image, but for many years it did not prove practical in many applications because it interfered with necessary focal plane mechanisms. The desirability of spacing the field flattener at some distance in front of the focal plane has long been recognized, but heretofore if spaced more than about 0.06 F therefrom it has made the image much worse, chiefly because of distortion and overcorrection of spherical aberration and field curvature, if strong enough to be effective in correcting the Petzval sum.

According to the present invention, a Petzval type projection objective with field flattener is constructed in which each positive member includes a positive compound component, that in the front member comprising a biconvex element cemented to the front of a negative element of higher refractive index, as is usual, and that in the rear positive member comprising a positive element cemented to a negative element of lower refractive index. I have discovered that this novel arrangement of the rear positive member permits the spacing of the field flattener more than 0.08 F from the focal plane while maintaining a high degree of correction of all aberrations and actually improving the zonal and oblique spherical aberration. Highly satisfactory objectives have been made up in which the back focal length is 0.10 F, and it is contemplated that this length can be increased to 0.15 F without seriously affecting the aberrations.

For the best working of the invention, the index difference at the aforesaid cemented surface in the front member should be between 0.10 and 0.25 and that at the cemented surface in the rear positive member should be greater than 0.02. The latter may be as great as available materials permit, suitable materials having been made experimentally which differ by nearly 0.40 in index. The positive element in the rear positive member should have an index higher than 1.62, and known materials permit it to be nearly as high as 2.00. The biconvex element in the front component may have any available refractive index, that is from about 1.39 to about 1.75, although indices greater than 1.50 give somewhat better correction of the zonal spherical aberration than do the lower indices.

The requirements of color correction are so well known as to require no explanation here. However, it may be said that the front member is substantially corrected for color, or slightly overcorrected; that is $\Sigma hp/V$ is approximately zero or slightly negative where V is the conventional dispersive index of the glass of which a lens element is made, $p$ is the power of a surface of the lens element, computed as if the element were bounded by air, and $h$ is the height above the axis at which the surface is pierced by a ray which strikes the first surface of the objective at unit height above the axis and parallel thereto, and the summation is carried out over both surfaces of all the elements of the front member. The rear member and the field flattener may be separately corrected for color by making both of them compound, but a simpler construction results if the field flattener is made of a single piece of glass and the rear positive member is under-corrected for color, that is $\Sigma hp/V$ summed over all the lens surfaces of the rear positive member is positive and preferably less than 0.01 P where P is the power of the whole objective. With this arrangement, the front member should be very slightly over-corrected in order to correct the lateral and axial color of the whole objective simultaneously.

The chief novelty in the negative component which acts as a field flattener is its position at a distance in front of the short conjugate plane. In the case of objectives corrected for a long throw or great image distance the short conjugate plane is substantially at the principal focal plane, and according to the invention the negative component is spaced between 0.08 F and 0.15 F in front of the principal focal plane. In the case of objectives corrected for use in projecting an image at a lower magnification M, I have found it advantageous to position the negative component closer to the principal focal plane by about 0.5 F/M. Petzval type lenses are seldom used at magnifications smaller than about 6.

To be effective in correcting the Petzval sum and flattening the field, the focal length of the negative component should be between 0.5 F and 2.0 F. Its shape is preferably such that the rear surface is plane or convex with a radius of curvature greater than 0.7 F.

The refractive index and V-value of the glass used in this component may be anything within the range of available glasses, that is V may range from about 25 to about 100. I find it advantageous to delay the choice of this V-value until late in the course of the designing of the objective, and then choose a V-value which has the best effect on lateral color. This component has a greater effect on the Petzval sum if its refractive index is then chosen in the lower part of the available range. This preferred range of index varies considerably with the V-value; and for known glasses it is roughly such that $$\left(N - \frac{12}{V+5}\right)$$

is between 1.25 and 1.40. For example if V is 95, N should be between 1.37 and 1.52; if V is 55, N should be between 1.45 and 1.60; and if V is 25, N should be between 1.65 and 1.80.

Although the invention is directed primarily to the structure of the second positive member and the field flattener, a preferred feature of the invention relates to the structure of the front member. According to this preferred feature, the front member consists of a positive compound component and a positive meniscus simple element therebehind, the meniscus element having a refractive index between 1.69 and 1.90 and a V value greater than about (215−100 N). The V value should be as great as possible, but at present suitable materials are not available with V larger than (230−100 N) in this range of refractive indices.

As will be clear from the above discussion, various arrangements of the lens elements within the two positive members may be used. By way of example, three arrangements which have been successfully used are shown in the accompanying drawings, in which:

Figs. 1 and 2 show a projection objective according to a preferred form of the invention.

Fig. 3 gives data for a slight modification thereof.

Figs. 4 and 5 show an objective according to a slightly different form of the invention.

Figures 6, 7, 8:
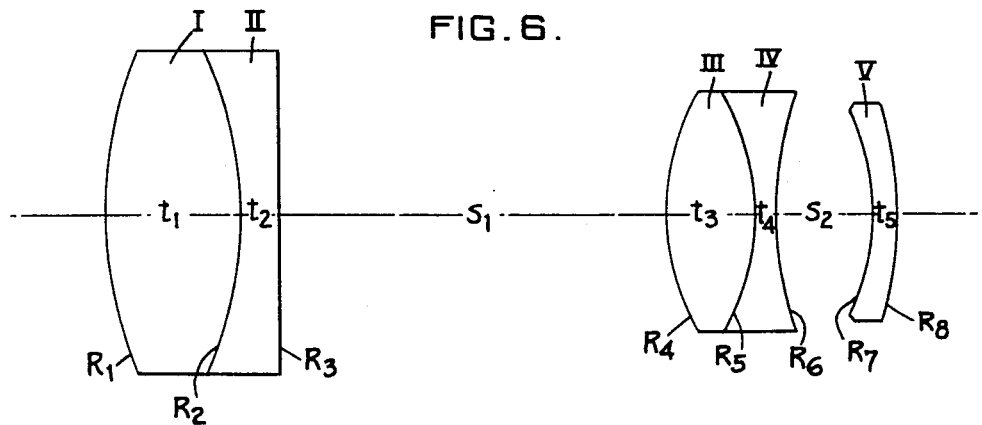
Figs. 6 and 7 show an objective of simpler form according to the invention.

Fig. 8 gives data for a modification of Fig. 6 designed for use at finite conjugates.

The tables of data in the drawings are repeated below for convenience. In these tables the lens elements are numbered from front to rear in the first column, the corresponding refractive indices N for the D line of the spectrum and the conventional reciprocal dispersive indices V are given in the second and third columns, and in the last two columns are given the radii of curvature R of the lens surfaces, the thicknesses t of the lens elements, and the spaces s between the components each numbered by subscripts from front to rear, and also the back focal length BF. The + and − values of the radii indicate surfaces respectively convex and concave to the front.

Figs. 1, 2 and 3 show two examples of the preferred form of the invention wherein the front member comprises a positive compound component and a high index positive meniscus component therebehind. In these examples the compound component consists of a biconvex element of crown glass and a negative element of flint glass. The refractive index of the crown glass is conveniently between 1.5 and 1.55 and that of the flint glass between 1.6 and 1.7. The ratio of the two dispersive indices should be between 1.7 and 2.3 depending upon the glass used in the meniscus component. I have found it advantageous to make the focal length of the doublet considerably longer than that of the single meniscus element, preferably between 7F and 20 F, and I have obtained very good correction of spherical aberration and coma by shaping these two components so that $R_1$ is between 1.5 F and 2 F, $R_2$ is between −0.6 F and −F, $\pm R_3$ is greater than 5 F, $R_4$ is between 0.6 F and F, and $R_5$ is between F and 2 F, and by spacinng these two components less than 0.05 apart.

The data for the two specific examples is as follows:

*Example 1.—Figs. 1 and 2*

[F=100 mm.   F/1.5.]

| Lens | N | V | Radii | Thicknesses |
|---|---|---|---|---|
| I | 1.517 | 64.5 | $R_1$=+170.91 mm. | $t_1$=19.36 mm. |
| II | 1.649 | 33.8 | $R_2$=− 76.88 | $t_2$= 6.34 |
|  |  |  | $R_3$=+1608. | $s_1$= 0.97 |
| III | 1.744 | 45.8 | $R_4$=+ 79.53 | $t_3$=11.62 |
|  |  |  | $R_5$=+144.64 | $s_2$=74.35 |
| IV | 1.697 | 56.2 | $R_6$=+ 42.30 | $t_4$=16.54 |
| V | 1.673 | 32.2 | $R_7$=− 77.49 | $t_5$= 4.13 |
|  |  |  | $R_8$=+121.34 | $s_3$=18.22 |
| VI | 1.617 | 36.6 | $R_9$=− 38.45 | $t_6$= 2.07 |
|  |  |  | $R_{10}$=−966.2 | BF=10.0 |

*Example 2.—Figs. 1 and 3*

[F=100 mm.   F/1.5.]

| Lens | N | V | Radii | Thicknesses |
|---|---|---|---|---|
| I | 1.517 | 64.5 | $R_1$=+173.21 mm. | $t_1$=19.60 mm. |
| II | 1.649 | 33.8 | $R_2$=− 77.93 | $t_2$= 6.41 |
|  |  |  | $R_3$=+1630. | $s_1$= 0.98 |
| III | 1.744 | 45.8 | $R_4$=+ 92.43 | $t_3$=11.76 |
|  |  |  | $R_5$=+197.71 | $s_2$=76.72 |
| IV | 1.697 | 56.2 | $R_6$=+ 43.22 | $t_4$=16.74 |
| V | 1.612 | 35.1 | $R_7$=− 57.82 | $t_5$= 4.16 |
|  |  |  | $R_8$=+ 92.94 | $s_3$=18.33 |
| VI | 1.615 | 31.9 | $R_9$=− 32.95 | $t_6$= 2.16 |
|  |  |  | $R_{10}$=−118.87 | BF=10.0 |

The second member in both these examples consists of a biconvex element IV cemented to the front of a biconcave element V of lower refractive index, so that the cemented surface has positive power in each case. The difference in index is 0.024 in one case and 0.085 in the other. The larger index difference in Example 2 is an advantage, and is gained by the use of a fluosilicate glass of the type described in a copending application, Serial No. 722,276 Osborn and De Paolis. The field flatteners VI of this example and of Example 3 below, are also made of glass of this type. All the other lens elements are made of glasses that are already commercially available.

Figs. 4 and 5 show an objective according to a different form of the invention. In this example the front member is a cemented doublet of a rather usual construction except that it is shaped so that the front surface is unusually flat. The second member consists of a biconcave element of flint glass cemented between two positive elements of crown glass of which the one in front is biconvex and has a lower refractive index and the one behind is nearly plano-convex and has a higher refractive index than that of the biconcave element. The last-named positive element forms with the biconcave element a cemented surface of positive power in accordance with the invention.

I have found that good correction of the coma and spherical aberration can be obtained in an objective of this form embodying the invention by making the radius of curvature of the front surface of the front member between ⅔ F and F and that of the front surface of the second member between 0.8 F and 1.4 F.

The data given in Fig. 5 are as follows:

*Example 3.—Figs. 4 and 5*

[F=100 mm.    f/1.6.]

| Lens | N | V | Radii | Thicknesses |
|---|---|---|---|---|
| I | 1.523 | 58.6 | $R_1=+79.35$ mm. | $t_1=25.66$ mm. |
| II | 1.649 | 33.8 | $R_2=-68.95$ | $t_2=6.43$ |
|  |  |  | $R_3=-1786.$ | $s_1=64.35$ |
| III | 1.517 | 64.5 | $R_4=+110.14$ | $t_3=9.83$ |
| IV | 1.580 | 41.0 | $R_5=-37.65$ | $t_4=3.93$ |
| V | 1.880 | 41.1 | $R_6=+34.80$ | $t_5=9.82$ |
|  |  |  | $R_7=-554.1$ | $s_2=25.33$ |
| VI | 1.615 | 31.9 | $R_8=-40.72$ | $t_6=1.98$ |
|  |  |  | $R_9=-1004.$ | BF=9.83 |

In this example the difference in refractive index between the first two elements I and II is 0.126, and the ratio of their dispersions is 1.73. In the second member the index difference at the first cemented surface is 0.063 and that at the second cemented surface is 0.300. The first of these surfaces is effective in correcting color, the ratio of V-values being 1.6, whereas at the second surface there is practically no difference in V-values. The particular distribution of the burden of color correction is of little or no advantage in the successful operation of the lens, but it does permit the radius $R_6$ of the second surface to be varied during the designing of the lens without upsetting the color correction appreciably.

Very good results have been obtained by giving the radius of curvature of the first of these cemented surfaces a value between 0.3 F and 0.5 F and that of the second a value between ¼ F and F, depending somewhat on the index difference in each case. The curvatures of the rear surfaces of the two positive members is determined within narrow limits by the focal lengths assigned to these members. In all the examples shown, the focal length of the front member is between 1.8 F and 2.1 F and that of the second member between 0.7 F and F, although the invention is also useful in objectives falling outside this range.

The examples shown in Figs. 6, 7, and 8 consist of two cemented doublets and a negative singlet. Fig. 7 gives data for a projection lens as follows:

*Example 4.—Figs. 6 and 7*

[F=100 mm.    f/1.6.]

| Lens | N | V | Radii | Thicknesses |
|---|---|---|---|---|
| I | 1.523 | 58.6 | $R_1=+76.73$ mm. | $t_1=25.8$ mm. |
| II | 1.649 | 33.8 | $R_2=-71.71$ | $t_2=6.4$ |
|  |  |  | $R_3=\infty$ | $s_1=71.1$ |
| III | 1.697 | 56.2 | $R_4=+43.80$ | $t_3=16.9$ |
| IV | 1.621 | 36.2 | $R_5=-49.26$ | $t_4=4.2$ |
|  |  |  | $R_6=+90.76$ | $s_2=17.6$ |
| V | 1.523 | 58.6 | $R_7=-31.80$ | $t_5=4.2$ |
|  |  |  | $R_8=-77.09$ | BF=9.9 |

Fig 8 gives data for an objective designed for use in a television receiver to work at a magnification of 10 times. The tolerance on image sharpness is not so strict when the lens is used for this purpose, and so it may be used with a larger aperture, F/1.5, to increase the image brightness. The data given in Fig. 8 is as follows:

*Example 5.—Figs. 6 and 8*

[F=100 mm.    M=10×    f/1.5.]

| Lens | N | V | Radii | Thicknesses |
|---|---|---|---|---|
| I | 1.523 | 58.6 | $R_1=+84.39$ mm. | $t_1=26.36$ mm. |
| II | 1.649 | 33.8 | $R_2=-68.81$ | $t_2=6.60$ |
|  |  |  | $R_3=-989.3$ | $s_1=79.86$ |
| III | 1.697 | 56.1 | $R_4=+43.26$ | $t_3=16.36$ |
| IV | 1.621 | 36.2 | $R_5=-51.87$ | $t_4=4.06$ |
|  |  |  | $R_6=+96.74$ | $s_2=22.18$ |
| V | 1.572 | 56.8 | $R_7=-25.44$ | $t_5=2.20$ |
|  |  |  | $R_8=-97.70$ | BF=4.9 |

In these examples the radius of curvature $R_1$ of the front surface is in the same range as Example 3, that is between ⅔ F and F. The radius of curvature $R_4$ of the front surface of the second member is much shorter, however, being preferably between 0.35 F and 0.6 F. Corresponding to this, the rear surface of the second doublet should be concave to maintain the focal length of this doublet within the preferred range.

The cemented surface in each front doublet has the customary negative power, the index difference being 0.126 and the ratio of V-values being 1.7.

The cemented surface in the second doublet has positive power in accordance with the invention, the index difference being 0.076. In this form of the invention, I have obtained best results by making the latter cemented surface concave to the front with a radius of curvature between ¼ F and F.

In all the examples the central space ($s_2$ in Examples 1 and 2 and $s_1$ in Examples 3, 4, and 5) is between 0.6 F. and 0.9 F.; it is slightly longer in Example 5, which is corrected for finite conjugates, than in the other examples.

The field flattener in Examples 1 to 4 is spaced 0.10 F. from the principal focal plane, and in Example 5, which is corrected for use at a magnification of 10×, it is closer to the principal focal plane by about 0.5 F/M or 0.05 F. The focal length of this negative component is between 0.5 F and 2 F in every case, ranging from 0.61 F in example 5 to 1.07 F in Example 4. Its dispersive index of V-value ranges from 31.9 in Example 2 to 58.6 in Example 4, and the refractive index is between $$\left(1.25+\frac{12}{V+5}\right) \text{ and } \left(1.45+\frac{12}{V+5}\right)$$

in every case. The rear surface is convex in each example although it may be made plano or slightly concave. However, the best effect on distortion results if the principal ray is bent somewhat near equally at the two surfaces, and this arrangement usually involves a convex or plane rear surface.

The color is very well corrected in all these examples. As an illustration of the application of the rough $\Sigma hp/V$ rule, above described, details are given in the following table of the computation relative to Example 4.

| Lens | Surface | Power $\frac{p}{P}$ | $h$ | $V$ | $hp/VP$ | $\Sigma(hp/VP)$ |
|---|---|---|---|---|---|---|
| I | $R_1$ | +.6816 | 1.0000 | 58.6 | +.01163 | |
|   | $R_2$ | +.7293 | .8845 | 58.6 | +.01101 | |
| II | $R_2$ | −.9050 | .8845 | 33.8 | −.02368 | |
|    | $R_3$ | .0000 | .8640 | 33.8 | .00000 | −.00104 |
| III | $R_4$ | +1.5909 | .4900 | 56.2 | +.01387 | |
|     | $R_5$ | +1.4149 | .3602 | 56.2 | +.00907 | |
| IV | $R_5$ | −1.2607 | .3602 | 36.2 | −.01254 | |
|    | $R_6$ | −.0842 | .3253 | 36.2 | −.00615 | +.00425 |
| V | $R_7$ | −1.6446 | .1251 | 58.6 | −.01076 | |
|   | $R_8$ | +.6784 | .0990 | 58.6 | +.00115 | −.00961 |

The respective sums for all the examples are given in the following table:

| Example | Front Member | Second Member | Field Flattener |
|---|---|---|---|
| 1 | −.00092 | +.00482 | −.00476 |
| 2 | −.00086 | +.00485 | −.00497 |
| 3 | −.00107 | +.00833 | −.00507 |
| 4 | −.00104 | +.00425 | −.00961 |
| 5 | −.00445 | +.00472 | −.00198 |

It will be noted from these figures that the front member is slightly over corrected and the second member is under corrected to a greater degree than the front member is overcorrected, but still less than 0.01. The negative rear component is uncorrected in each case. It will be readily understood by those skilled in the art that the field flattener could be made of a substantially achromatic doublet and that then the over or under correction of the other two members would be much smaller than in these examples to maintain over all correction.

This formula for computing color correction is an empirical formula which differs somewhat from the theoretical formula pertaining to separated thin lenses and which has been found useful as a rough practical rule.

The examples given are illustrative of the invention, and various other arrangements of elements are also useful in objectives embodying the invention.

I claim:

1. A Petzval type projection lens corrected for use at a magnification M between six and infinity, which comprises two positive members made up of a total of from four to seven lens elements and separated by a central airspace larger than 0.2 F and smaller than 1.3 F where F is the local length of the objective, of which the front member is substantially corrected or slightly overcorrected for color, has a focal length between 1.4 F and 2.5 F, and comprises a biconvex element cemented to the front of a negative element whose refractive index is higher than that of the biconvex element by between 0.10 and 0.25 and the second member has a focal length between 0.7 F and 1.5 F, and in which the center of curvature of the front surface of the front member is behind the center of the central airspace, the centers of curvature of the surfaces bounding the central airspace are outside the body of the objective, and the center of curvature of the rear surface of the second member is outside of the space between the center of the central airspace and the principal focal plane, and which objective is characterized by having a negative component with a focal length between 0.5 F and 2.0 F spaced behind the second member and spaced in front of the focal plane by more than (0.08−0.5/M)F and less than (0.15−0.5/M)F where M is the magnification at which the lens is used and by having a positive compound component in the second member in which a positive element is cemented to a negative element of lower refractive index, the second member being substantially corrected or slightly undercorrected for color.

2. An objective as claimed in claim 1 in which the front member consists of a cemented doublet in front of a single positive meniscus element convex to the front, the positive meniscus element having a refractive index N between 1.69 and 1.90 and a dispersive index between (215−100 N) and (230−100 N).

3. An objective as claimed in claim 1 in which the front member consists of a cemented doublet in front of a single positive meniscus element convex to the front, the doublet having a focal length between 7 F and 20 F, in which the second member consists of a biconvex element cemented to the front of a biconcave element and the rear member consists of a single negative element, and in which the following algebraic inequalities hold true:

$1.50 < N_1 < 1.55$
$1.60 < N_2 < 1.70$
$1.7\, V_2 < V_1 < 2.3\, V_2$
$1.69 < N_3 < 1.90$
$215 < (V_3 + 100 N_3) < 230$
$1.62 < N_4 < 2.00$
$0.02 < (N_4 − N_5) < 0.40$
$25 < V_6 < 100$
$1.25 < \left(N_6 − \dfrac{12}{V_6 + 5}\right) < 1.40$
$1.5\, F < +R_1 < 2\, F$
$0.6\, F < −R_2 < F$
$5\, F < \pm R_3$
$0.6\, F < +R_4 < F$
$F < +R_5 < 2\, F$
$0.7\, F < −R_{10} \leq \infty$
$0 \leq s_1 < 0.05\, F$
$0.6\, F < s_2 < 0.9\, F$
$1.8\, F < F_1 < 2.1\, F$
$F_2 < F$ where the letters N and V denote the refractive and dispersive indices of a lens element, R denotes the radius of curvature of a lens surface, and s denotes the space between two components, and the subscripts on these letters denote the lens elements, the lens surfaces and the spaces each numbered in order from the front to the rear of the objective, and where $F_1$ and $F_2$ denote the focal lengths of the front and second members respectively.

4. An objective as claimed in claim 1 in which the second member consists of three lens elements cemented together, the rear element being positive with a refractive index between 1.62 and 2.00, the middle element being biconcave with a refractive index between 0.02 and 0.40 lower than that of the rear element, and the front element being biconvex with a refractive index lower than that of the bivoncave element.

5. An objective as claimed in claim 1 in which the front member consists of a front biconvex element and a negative element cemented thereto, the second member consists of a biconcave element and two positive elements cemented thereto, and the rear member consists of a single negative element, and in which the following algebraic inequalities hold true:

$$1.50 < N_1 < 1.75$$
$$0.10 < (N_2 - N_1) < 0.25$$
$$1.39 < N_3 < N_4$$
$$1.62 < N_5 < 2.00$$
$$0.02 < (N_5 - N_4) < 0.40$$
$$25 < V_6 < 100$$
$$1.25 < \left(N_6 - \frac{12}{V_6 + 5}\right) < 1.40$$
$$0.67\ F < +R_1 < F$$
$$0.8\ F < +R_4 < 1.4\ F$$
$$0.3\ F < -R_5 < 0.5\ F$$
$$0.25\ F < +R_6 < F$$
$$0.7\ F < +R_9 \leq \infty$$
$$1.8\ F < F_1 < 2.1\ F$$
$$F_2 < F$$
$$0.6\ F < s_1 < 0.9\ F$$

where the letters N and V denote the refractive and dispersive indices of a lens element, R denotes the radius of curvature of a lens surface, and the subscripts on these letters denote the lens elements and lens surfaces each numbered in order from the front to the rear of the objective, and where $F_1$ and $F_2$ denote the focal lengths of the front and second members respectively and $s_1$ is the distance between these two members.

6. An objective as claimed in claim 1 in which the front member consists of a biconvex element and a negative element cemented thereto, the second member consists of a front biconvex element and a biconcave element cemented thereto, and the rear member consists of a single negative element, and in which the following algebraic inequalities hold true:

$$1.50 < N_1 < 1.75$$
$$0.10 < (N_2 - N_1) < 0.25$$
$$1.62 < N_3 < 2.00$$
$$0.02 < (N_3 - N_4) < 0.40$$
$$25 < V_5 < 100$$
$$1.25 < \left(N_5 - \frac{12}{V_5 + 5}\right) < 1.40$$
$$0.67\ F < R_1 < F$$
$$0.35\ F < R_4 < 0.6\ F$$
$$0.25\ F < -R_5 < F$$
$$0.7\ F < -R_8 \leq \infty$$
$$1.8\ F < F_1 < 2.1\ F$$
$$F_2 < F$$
$$0.6\ F < s_1 < 0.9\ F$$

where the letters N and V denote the refractive and dispersive indices of a lens element, R denotes the radius of curvature of a lens surface, and the subscripts on these letters denote the lens elements and lens surfaces each numbered in order from the front to the rear of the objective, and where $F_1$ and $F_2$ denote the focal lengths of the front and second members respectively and $s_1$ is the distance between these two members.

7. An objective made substantially according to the specifications set forth in the following table:

| Lens | N | V | Radii | Thicknesses |
|---|---|---|---|---|
| 1 | 1.52 | 65 | $R_1 = +1.7\ F$ | $t_1 = 0.2\ F$ |
| 2 | 1.65 | 34 | $R_2 = -0.8\ F$ | $t_2 = 0.06\ F$ |
|  |  |  | $R_3 = +16\ F$ | $s_1 = 0.01\ F$ |
| 3 | 1.74 | 46 | $R_4 = +0.8\ F$ | $t_3 = 0.1\ F$ |
|  |  |  | $R_5 = +1.4\ F$ | $s_2 = 0.7\ F$ |
| 4 | 1.70 | 56 | $R_6 = +0.4\ F$ | $t_4 = 0.2\ F$ |
| 5 | 1.67 | 32 | $R_7 = -0.8\ F$ | $t_5 = 0.04\ F$ |
|  |  |  | $R_8 = +1.2\ F$ | $s_3 = 0.2\ F$ |
| 6 |  | 1.62 | 37 | $R_9 = -0.4\ F$ | $t_6 = 0.02\ F$ |
|  |  |  | $R_{10} = -10\ F$ | $BF = 0.1\ F$ | where the lens elements are numbered from front to rear in the first column, the corresponding refractive indices N for the D wavelength and the conventional dispersive index V are given in the second and third columns, and the radii of curvature R of the lens surfaces, the axial thicknesses $t$ of the lens elements, and the spaces $s$ between the components, each numbered by subscripts from front to rear, are given in the last two columns, and where F is the equivalent focal length and BF is the back focal length of the objective, and the + and − values of R indicate surfaces respectively convex and concave to the front.

8. An objective made substantially according to the specifications set forth in the following table:

| Lens | N | V | Radii | Thicknesses |
|---|---|---|---|---|
| 1 | 1.52 | 59 | $R_1 = +0.8\ F$ | $t_1 = 0.3\ F$ |
| 2 | 1.65 | 34 | $R_2 = -0.7\ F$ | $t_2 = 0.06\ F$ |
|  |  |  | $R_3 = -18\ F$ | $s_1 = 0.6\ F$ |
| 3 | 1.52 | 65 | $R_4 = +1.1\ F$ | $t_3 = 0.1\ F$ |
| 4 | 1.58 | 41 | $R_5 = -0.4\ F$ | $t_4 = 0.04\ F$ |
| 5 | 1.88 | 41 | $R_6 = +0.3\ F$ | $t_5 = 0.1\ F$ |
|  |  |  | $R_7 = -5.5\ F$ | $s_2 = 0.3\ F$ |
| 6 | 1.62 | 32 | $R_8 = -0.4\ F$ | $t_6 = 0.02\ F$ |
|  |  |  | $R_9 = -10\ F$ | $BF = 0.1\ F$ | where the lens elements are numbered from front to rear in the first column, the corresponding refractive indices N for the D wavelength and the conventional dispersive index V are given in the second and third columns, and the radii of curvature R of the lens surfaces, the axial thicknesses $t$ of the lens elements, and the spaces $s$ between the components, each numbered by subscripts from front to rear, are given in the last two columns, and where F is the equivalent focal length and BF is the back focal length of the objective, and the + and − values of R indicate surfaces respectively convex and concave to the front.

9. An objective made substantially according to the specifications set forth in the following table:

| Lens | N | V | Radii | Thicknesses |
|---|---|---|---|---|
| 1 | 1.52 | 59 | $R_1 = +0.8\ F$ | $t_1 = 0.3\ F$ |
| 2 | 1.65 | 34 | $R_2 = -0.7\ F$ | $t_2 = 0.06\ F$ |
|  |  |  | $R_3 = \infty$ | $s_1 = 0.7\ F$ |
| 3 | 1.70 | 56 | $R_4 = +0.4\ F$ | $t_3 = 0.2\ F$ |
| 4 | 1.62 | 36 | $R_5 = -0.5\ F$ | $t_4 = 0.04\ F$ |
|  |  |  | $R_6 = +0.9\ F$ | $s_2 = 0.2\ F$ |
| 5 | 1.52 | 59 | $R_7 = -0.3\ F$ | $t_5 = 0.04\ F$ |
|  |  |  | $R_8 = -0.8\ F$ | $BF = 0.1\ F$ | where the lens elements are numbered from front to rear in the first column, the corresponding refractive indices N for the D wavelength and the conventional dispersive index V are given in the second and third columns, and the radii of curvature R of the lens surfaces, the axial thicknesses $t$ of the lens elements, and the spaces $s$ between the components, each numbered by subscripts from front to rear, are given in the last two columns, and where F is the equivalent focal length and BF is the back focal length of the objective, and the + and − values of R indicate surfaces respectively convex and concave to the front.

WILLY SCHADE.

REFERENCES CITED

The following references are of record in the file of this patent:

UNITED STATES PATENTS

| Number | Name | Date |
|---|---|---|
| 1,610,514 | Graf | Dec. 14, 1926 |
| 1,797,202 | Warmisham | Mar. 17, 1931 |
| 1,843,519 | Richter | Feb. 2, 1932 |
| 2,076,190 | Wood | Apr. 6, 1937 |
| 2,187,780 | Gehrke et al. | Jan. 23, 1940 |
| 2,445,594 | Bennett | July 20, 1948 |